June 19, 1928.
P. MUELLER
FAUCET AND FITTINGS
Filed Sept. 9, 1924
1,674,561
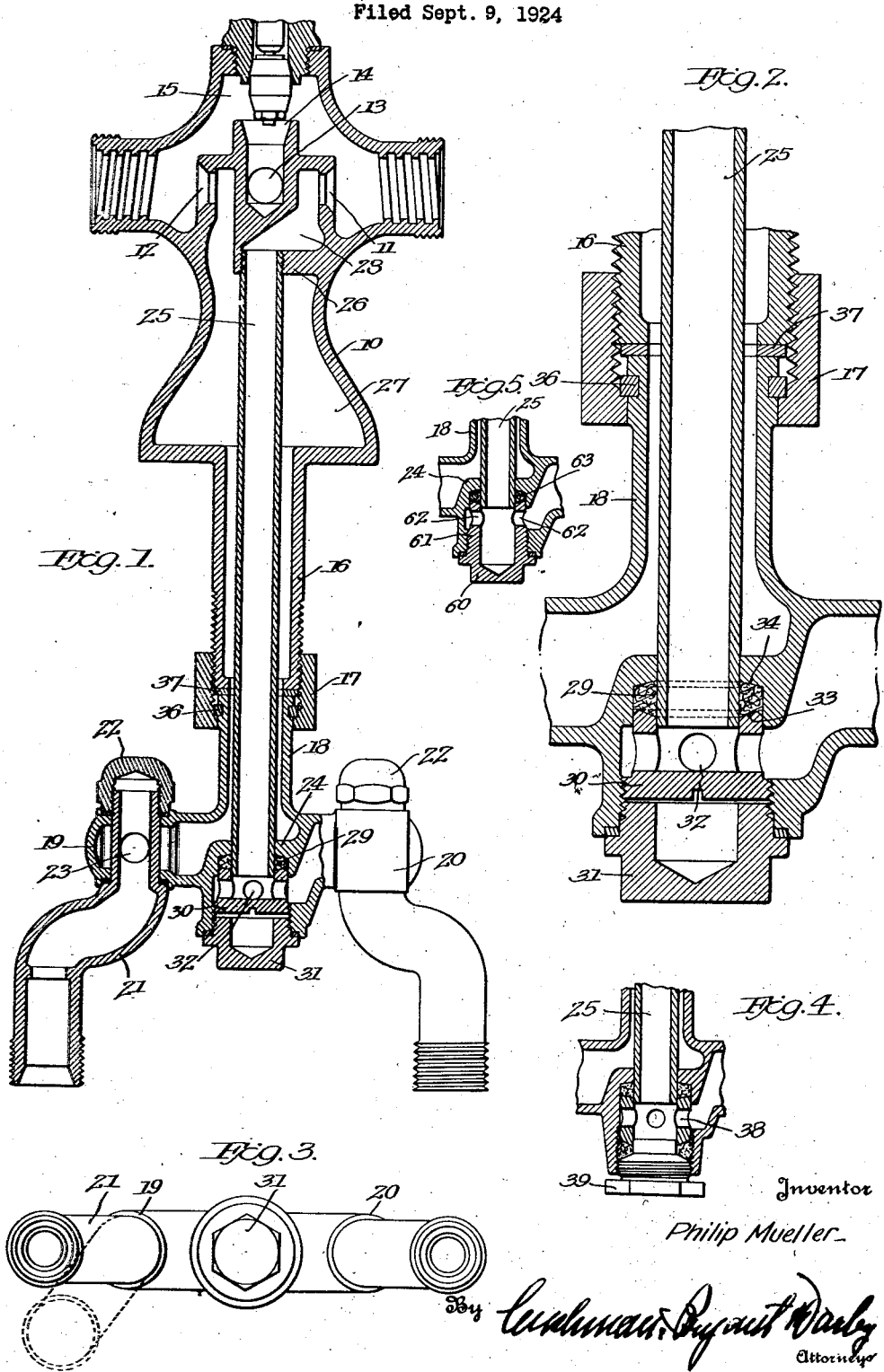
Inventor
Philip Mueller
By Cushman, Byrant & Darby
Attorneys Patented June 19, 1928.

1,674,561

UNITED STATES PATENT OFFICE.

PHILIP MUELLER, OF DECATUR, ILLINOIS, ASSIGNOR TO ADOLPH MUELLER, TRUSTEE, OF DECATUR, ILLINOIS.

FAUCET AND FITTINGS.

Application filed September 9, 1924. Serial No. 736,705.

This invention relates to faucets, and, as here shown, it is developed in connection with a lavatory faucet, although it will be understood that it is not limited to any specific type of fitting, but is adaptable to any type where two supplies of fluid, as, for example, hot and cold water, are delivered to and through the faucet.

It has for its object to provide a faucet, and particularly couplings between the faucet and the two sources of supply, namely, the hot and cold water, which may be very readily constructed and assembled, and which will insure a proper delivery of hot or cold water, or both, through independent passages to the faucet.

In my application, Serial No. 635,271, filed April 28, 1923, is disclosed a fitting of the same general type as that herein set forth, and the present development is an improvement in some respects and departure from what is found in the application above referred to.

In the drawings herewith is illustrated one embodiment of my invention, and in said drawings:—

Fig. 1 is a view in vertical section of a fixture made in accordance with my invention.

Fig. 2 is an enlarged sectional view of the lower end of the fitting shown in Fig. 1.

Fig. 3 is a view in bottom plan of the fixture.

Fig. 4 is a detail sectional view of a variation of the fitting construction.

Fig. 5 is a detail sectional view of another variation of the fitting construction.

Referring to the drawings by numbers, like numbers indicating like parts in the several views, 10 indicates the faucet body having provision for mounting the hot and cold water valves which control the ports 11 and 12 delivering to the interior of the faucet, but as these valves and their operating devices may be of any usual type, they are not illustrated or described in detail. In the particular type of faucet here shown, the fluid delivered from either or both of the ports 11, 12 passes to the spout outlet 13 by way of the valve seat 14, which is controlled by a switch cock or plug 15, but as this feature forms no part of the present invention, it is not described in detail.

The faucet 10 has the usual tail piece 16 threaded at its lower end, and secured to that tail piece by any suitable means, as, for example, by the coupling nut 17, is a substantially T-shaped fitting 18, the connection between the fitting 18 and the tail 16 of the faucet being a packed and sealed connection, as shown. The T-shaped fitting 18 has the angularly disposed nipples 19 and 20 extending at substantially right angles from the body of the fitting, and provided with through apertures to receive the ends of the coupling pipes 21, which are mounted so as to swivel in the arms 19 and 20, so that they may be angularly adjusted to take care of variations in the relative positions of the supply pipes, which supply pipes will be coupled by any suitable means to the lower ends of the curved pipes 21. The pipes 21 may be secured in place in any suitable manner, and in the present instance, are shown as held by the cap nuts 22 threaded to the upper ends of the pipes 21, sealing gaskets being provided on each side of the nipples 19 and 20 to give a tight joint when the parts are set up. The pipes 21 are provided within the nipples with orifices 23 to permit flow from the supply pipes through the pipes 21 to the fitting 18 and the faucet.

The fitting 18 is divided horizontally by a partition 24, so that flow coming from one side, the left in Fig. 1, through the coupling pipes 21 will pass above the partition 24, and flow from the other side, the right in Fig. 1, will pass below the partition.

Fluid coming from the left and passing above the partition will flow up the fitting 18 through the tail 16 of the faucet into the faucet chamber, and be delivered through the port 12 to the delivery chamber, and thence to the spout opening 13.

In order that the fluid coming from the nipple 20 and passing beneath the partition 24 may be delivered to the faucet as an independent supply, I provide the up-take pipe 25 threaded or otherwise suitably secured at its upper end to a horizontally disposed wall 26, separating the interior of the faucet into the chambers 27 and 28. The up-take pipe 25 extends down through the tail 16 of the faucet, and the fitting 18, the size of the assembled parts being such as to insure a sufficient water way, both in the pipe 25 for one supply, and between the pipe 25 and the fitting 18, and the tail of the faucet 16 for the other supply. The lower end of the pipe 25 extends through the partition 24 which divides the fitting 18, and the said lower end is sealed by means of the packing 29 and threaded sleeve 30 threaded into the lower end of the fitting 18. A closure plug 31 is also threaded into the lower end of the fitting 18 to close the opening therein. The threaded sleeve 30 is provided with apertures 32 in its wall, so that flow coming from the nipple 20 will pass by these apertures to the sleeve, and, by the up-take pipe 25 to the chamber 28, and thence, by the port 11, may pass to the spout.

Preferably, and as best shown in Fig. 2, the sleeve 30 will have its upper end concaved or dished, as at 33, and the partition wall 24 will be correspondingly and oppositely dished as at 34. By this arrangement the packing 29 will be lightly compressed, and the tendency will be to urge it inwardly and compress it tightly about the lower projecting end of the up-take pipe 25.

The upper end of the fitting 18 and the tail 16 of the faucet are, as stated, coupled together by the coupling nut 17, and, as here shown, that is accomplished by providing the ring member 36 which, after the coupling sleeve 17 has been slipped in place on the fitting 18, will be compressed into a groove in the fitting 18, said ring and groove being arranged slightly below the top of the fitting. Between the tail 16 of the faucet and the top of the fitting 18 will be interposed a sealing gasket 37, so that when the parts are assembled and the coupling nut 17 is set up, an absolutely tight joint results.

The advantage of this construction is that the faucet body and tail may be readily cast, and this is true also of the T-shaped connection and the curved supply pipes therefor, and they may be readily machined and fitted for assembly without any intricate casting or machining problems. The up-take pipe 25 may be made of any commercial pipe of suitable size, cut into appropriate lengths, and very quickly and readily fitted in place, and assembled into the complete structure. It will be seen that, as constructed, the faucet may be set up or taken down and entirely disassembled for replacement or repair without any difficulties, and with the ordinary tools, there being no operations, except the simple ones of backing off or loosening ordinary threaded connections.

A further practical and important advantage of this construction resides in the fact that the T-shaped fitting 18 may be readily swivelled through any degree of a circle in a horizontal plane, thus adapting the fitting to be adjusted to any angle in cooperation with the offset supply pipes 21 required in connecting the usual supply pipes (not shown) to the tail piece 16 of the faucet 10. These supply pipes through necessity from various causes are in some installations located close together, and in others farther apart, and the combination described facilitates the work of the plumber in making the supply connections to the faucet.

In Fig. 4 is shown a slight variation in the construction. The apertured packing member 38, will engage the lower end of the supply pipe with packing to make a tight joint, exactly as heretofore set forth, and a packing is interposed between the plug 39 and the lower end of the member 38.

The variation illustrated in Figure 5 differs from those illustrated in Figures 1 to 4 and previously described in that the lower end of the fitting 18 is closed by a plug 60 having an integral tubular extension 61 which receives the lower end of the pipe 25 and has formed in its side wall the apertures 62 through which water from the nipple 20 can flow into the pipe 25. A suitable packing 63 is arranged about the lower end of the pipe 25 between the partition 24 and the inner end of the plug 60. An important feature of the invention is the fact that the tube 25 which constitutes the connection from one of the chambers of the fitting 18 to one of the ports in the faucet body is independently connected to the latter, and so arranged that the two water passages through the body of the fixture are both of circular form in cross section and arranged concentrically with relation to each other. This enables the adjustment of the supply connections relative to the faucet and supply pipes so that if, for example, the plumber shall have located the hot water service pipe in the position where the cold water service pipe should have been positioned, the fitting 18 can be turned to an angle of one hundred and eighty (180) degrees, bringing the hot and cold water to the customary side of the faucet, thus rectifying the error made by the plumber in installing the service pipes.

By making the sleeve 30 adjustable, it is possible to take up any wear which may occur in the packing between the inner end thereof and the partition in the fitting 18. That is, by removing the plug 31, access can readily be had to the sleeve 30 to permit of any desired adjustment thereof.

Such changes as call for the exercise of mechanical skill or amount to nothing but the adoption of expedients which are the equivalents of those here disclosed may be made, and still be within the range of my invention.

I claim:

1. The combination with a faucet having a body provided with a chamber including two ports adapted to deliver independent supplies thereto, of a fitting connected with the faucet body by a swivel joint and provided with two separated chambers, each adapted to be connected with a source of supply, and independent connections between the said fitting chambers, respectively, and the ports of the faucet.

2. The combination with a faucet having a body provided with a chamber including two ports adapted to deliver independent supplies thereto, of a substantially T-shaped fitting having its stem member connected to the faucet body by a swivel joint and having two chambers within its head member, each adapted to be connected with a source of supply, and independent connections between the said fitting chambers, respectively, and the ports of the faucet.

3. The combination with a faucet having a body provided with a chamber including two ports adapted to deliver independent supplies thereto and with a tubular stem that communicates with one of said ports, a fitting having two chambers, each provided with an inlet adapted to be connected with a source of supply, a coupling connecting the fitting with the stem of the faucet body, with one of the fitting chambers in communication with the bore of said stem, and permitting the fitting to be rotated without relative movement between it and the faucet body in the direction of the length of the faucet body stem, and an independent connection between the other chamber of the fitting and the second aforesaid port in the faucet.

4. The combination with a faucet having a body provided with a chamber including two ports adapted to deliver independent supplies thereto and with a tubular stem that communicates with one of said ports, a fitting having two chambers, each provided with an inlet adapted to be connected with a source of supply, a coupling connecting the fitting with the stem of the faucet body, with one of the fitting chambers in communication with the bore of said stem, and permitting the fitting to be rotated without relative movement between it and the faucet body in the direction of the length of the faucet body stem, and a conduit extending through the stem of the faucet body and the chamber of the fitting communicating with said stem into the other chamber in the fitting and adapted to deliver fluid from the last said chamber to the second aforesaid port in the faucet.

In testimony whereof I have hereunto set my hand.

PHILIP MUELLER.